United States Patent
McPeak

(10) Patent No.: US 8,516,434 B2
(45) Date of Patent: Aug. 20, 2013

(54) METHODS FOR MARKING, MERGING, AND MANAGING THE RESULTS OF SOFTWARE PROGRAM ANALYSIS

(75) Inventor: Scott G. McPeak, San Francisco, CA (US)

(73) Assignee: Coverity, Inc., San Francisco, CA (US)

( * ) Notice: Subject to any disclaimer, the term of this patent is extended or adjusted under 35 U.S.C. 154(b) by 1064 days.

(21) Appl. No.: 12/168,851

(22) Filed: Jul. 7, 2008

(65) Prior Publication Data

US 2010/0005444 A1  Jan. 7, 2010

(51) Int. Cl.
*G06F 9/40* (2006.01)

(52) U.S. Cl.
USPC .......................................... 717/100; 717/154

(58) Field of Classification Search
USPC ........................................................ 717/100
See application file for complete search history.

(56) References Cited

U.S. PATENT DOCUMENTS

| | | | |
|---|---|---|---|
| 7,827,145 B1 * | 11/2010 | Spertus et al. | 707/647 |
| 2004/0044987 A1 * | 3/2004 | Kompalli et al. | 717/100 |
| 2004/0267756 A1 * | 12/2004 | Bayardo et al. | 707/10 |
| 2008/0098349 A1 * | 4/2008 | Lin et al. | 717/106 |
| 2008/0155492 A1 * | 6/2008 | Cole et al. | 717/100 |
| 2009/0119649 A1 * | 5/2009 | Jegoulev et al. | 717/131 |

* cited by examiner

*Primary Examiner* — Li B Zhen
*Assistant Examiner* — Joanne Macasiano
(74) *Attorney, Agent, or Firm* — Schwegman Lundberg & Woessner, P.A.

(57) ABSTRACT

Methods are provided for marking and merging individual report elements, patterns, or defects resulting from analysis based on common characteristics within a report or across reports resulting from different analysis runs. Methods are also provided for migrating a set of report elements, patterns, or defects resulting from one version of an analysis tool to one consistent with a new version of the analysis tool while preserving as much information as possible from the older set.

21 Claims, 9 Drawing Sheets

METHODS FOR MARKING, MERGING, AND MANAGING THE RESULTS OF SOFTWARE PROGRAM ANALYSIS

BACKGROUND OF THE INVENTION

As software pervades more aspects of the everyday environment, it becomes more invisible to those that benefit from it. It therefore becomes more critical that the software operate correctly and reliably, since the consequences of failure can be far-reaching, and will involve more individuals that are ill-equipped to deal with software. As the complexity of software increases, it becomes more difficult to prove out the correctness of the software. Therefore tools and systems for analyzing the correctness and robustness of software programs may play an important role in helping software writers manage the quality of their software in the context of its complexity and its interaction with the wide variety of environments in which it may perform.

During the development of a sophisticated software program, analysis tools may be used on an ongoing basis to identify opportunities to make changes. These analysis tools may operate statically, by analyzing a software program in isolation, or dynamically, by analyzing a software program as it executes. Opportunities for program changes may represent outright errors, operational weaknesses, or areas that may prove difficult for others to understand when trying to maintain the software in the future, among other things. Such issues will hereinafter be referred to as individual defects. An analysis program may identify thousands of individual defects within a software program.

Defects represent an example of what may be identified by an analysis tool, but it may be appreciated that certain analysis tools may report on items that are not defects, and may more generally identify specific instances of patterns in the code; the discussion may apply equally to such analysis cases. The term "pattern" will be used hereinafter to indicate such specific instances of a pattern for discussion of concepts, although specific examples may involve analysis of defects. A specific instance of a pattern identified in a program will hereinafter be referred to as an individual pattern; an individual defect is one possible embodiment of such an individual pattern.

It may occur that a single issue or problem in the program have more than one apparent consequence in the program, yielding multiple individual patterns. In addition, a given individual pattern as identified by multiple runs of the analysis tool should be considered a single issue even though each run of the analysis tool will have identified a separate instance. For the purposes of managing the number of patterns, it may be useful to merge equivalent individual patterns according to some context-appropriate criteria, providing a single point of reference while still maintaining access to the individual patterns. These will hereinafter be referred to as merged patterns. The number of merged patterns, while still potentially very large, will by definition be smaller than the number of individual patterns, reducing the scope of the management problem. It may be appreciated, however, that the correct balance must be struck between eliminating multiple manifestations of a single problem within and across analysis runs and inadvertently merging different issues, which may result in the obscuring of one individual pattern by subsuming it under another. This latter tendency may be referred to as over-merging.

Merged patterns may be approximately divided into three categories: those that will be addressed by the time the program is complete; those that will not be addressed; and those that are actually mis-reported, so-called false-positive reports. These categories may vary, and may be further divided up into more precise descriptions. Upon running the analysis tool, the programmer will need to inspect each pattern and decide how to disposition the pattern. This process will hereinafter be referred to as triage. The pattern disposition will generally change throughout the project, as, for example, a given pattern is identified as one that must be addressed, and then eventually is addressed and closed out.

A development project may span many months or even years, involving hundreds of files distributed over a potentially complex network of computers, servers, and storage units. Some of those files may be renamed or moved between directories. Many or all of those files will undergo numerous revisions, and any such revisions may or may not resolve patterns discovered by an analysis tool, and any given revision may in fact create new patterns on a subsequent run of a given analysis tool. In addition, over the span of the project, the analysis tools themselves may undergo revisions, changing the manner in which they analyze the software program and merge individual patterns. Given the scope of pattern triage, it may be appreciated that it is critical that patterns be identified, merged, and managed in a manner that is relatively insensitive to changes in the program files and how and where they are stored, and that accommodates the upgrading of analysis tools that may involve analysis algorithm revisions and different merging techniques. Were such changes to affect the analysis results sufficiently, then the triage performed on prior runs would be nullified by a subsequent run, and would have to be redone, potentially for each run of the analysis tools. The impact of this would be a severe productivity reduction, or possibly reluctance by a user to upgrade analysis tools that might otherwise provide greater utility than the older version.

Analysis tools may be embedded in an overall environment that may include one or more databases for use in managing the history, status, and contents of the project. Within the database, it may be beneficial that all merged patterns be manageable as if in a single table. The details of whether the patterns are indeed in a single table or are in multiple tables that are merged through a query or some other mechanism are not material; the ability to view and/or manage all patterns as if collocated may improve the manageability of a project. Such databases and tables must be stable for the life of the project, so it may be appreciated that any changes to the analysis tools or environment that affect the structure of the database and/or table must be managed in a way that preserves existing information in the database and/or table.

Conventional methods for merging and managing patterns lack stable mechanisms for ensuring consistent pattern merging through the life of a project. In addition, the merging rules are specific enough that subtle changes in a new revision of the analysis tools may undo the merging and hence the triage from prior runs. It may be appreciated, therefore, that there remains a need for new more stable methods of merging that are durable in light of changes in file and directory naming, source code changes, analysis tool changes, and that resist over-merging. In addition, a need remains for methods that allow upgrading the merged pattern contents of a database in light of merging rule changes that preserve merged pattern triage results as much as possible, and manage in a predictable and understandable manner those merged patterns whose triage status needs to be changed.

SUMMARY OF THE INVENTION

In one aspect of the invention, methods are provided for identifying individual patterns and merging them in a manner that is robust in light of source file changes, source file naming and location, analysis tool version, and is resistant to over-merging.

In another aspect of the invention, methods are provided that allow the migration from one version of an analysis tool, having one means of identifying and merging individual patterns, to another version of the analysis tool, potentially having different means of identifying and/or merging individual patterns.

DETAILED DESCRIPTION OF EXEMPLARY EMBODIMENTS OF THE INVENTION

Figure 1:
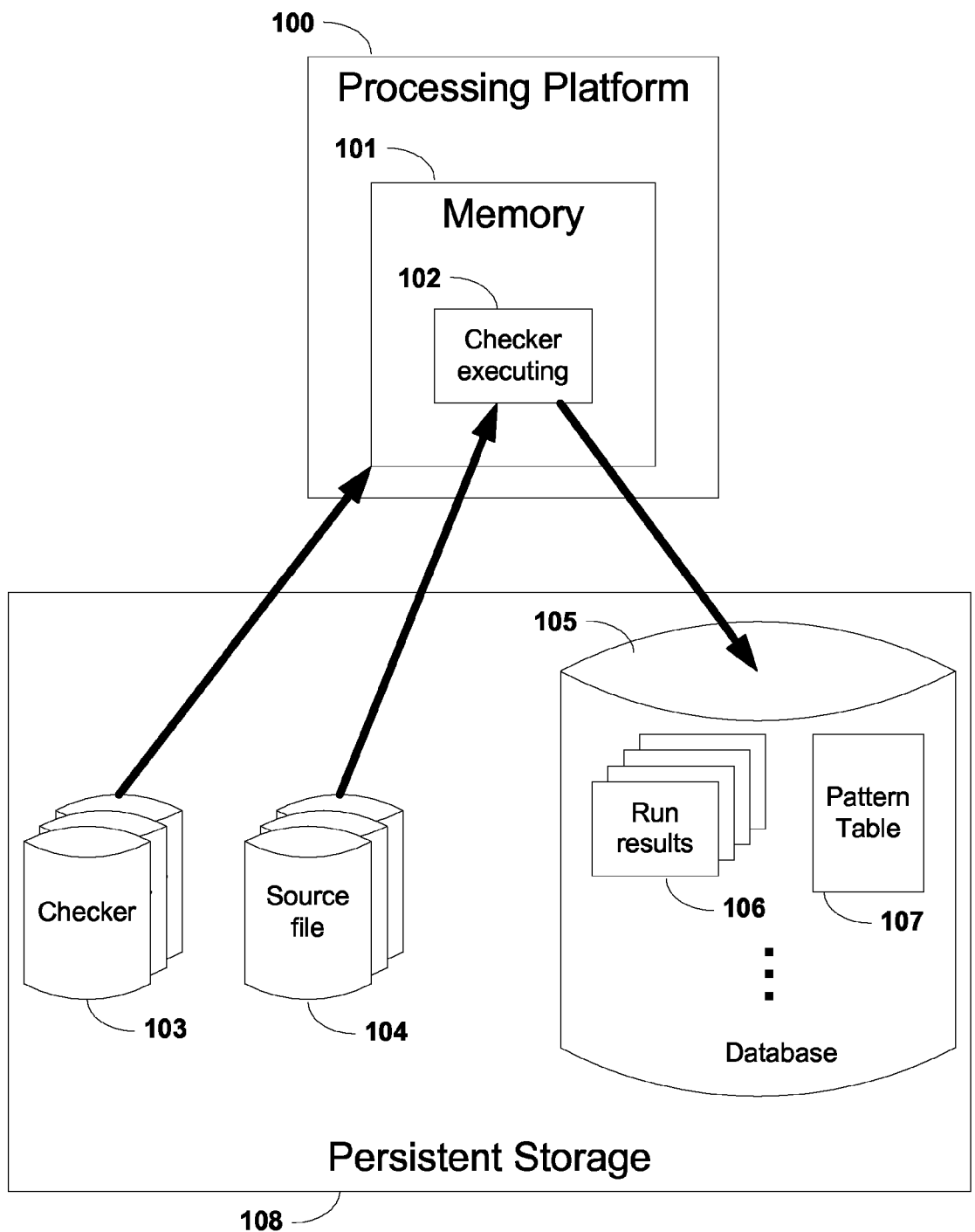
FIG. 1 illustrates an exemplary system on which the invention may execute.

FIG. 1 illustrates an exemplary software development environment in which the invention may be used. It shows Processing Platform 100 which contains Memory 101, within which various programs may reside during execution. In Persistent Storage 108 there may exist one or more Checkers 103, one or more of which (Checker 102) may be executing in Memory 101. Any program that performs analysis for a specific type of pattern within program source code will hereinafter be referred to as a checker, although such programs may be called by different names. The use of the word "checker" is for convenience only, and is not intended to limit the type of analysis program lying within the scope of the invention. Executing Checker 102 may analyze one or more Source Files 104, and then create output in Database 105. Database 105 may contain, among other things, a series of Run Results 106 and a Pattern Table 107. Pattern Table 107 may consist of the collection of merged patterns generated from the analysis performed cumulatively by the Checkers 103. The specific nature of the processing platform, memory, and storage, and the means by which the storage is interconnected to the processing platform may vary, and are not intended to limit the invention. The source codes may be written in any programming language amenable to analysis. Certain languages may not admit certain types of analysis—for example, Java may not require a memory leak checker—but given the possible range of checkers, any language may fall within the scope of the invention.

Figure 2:
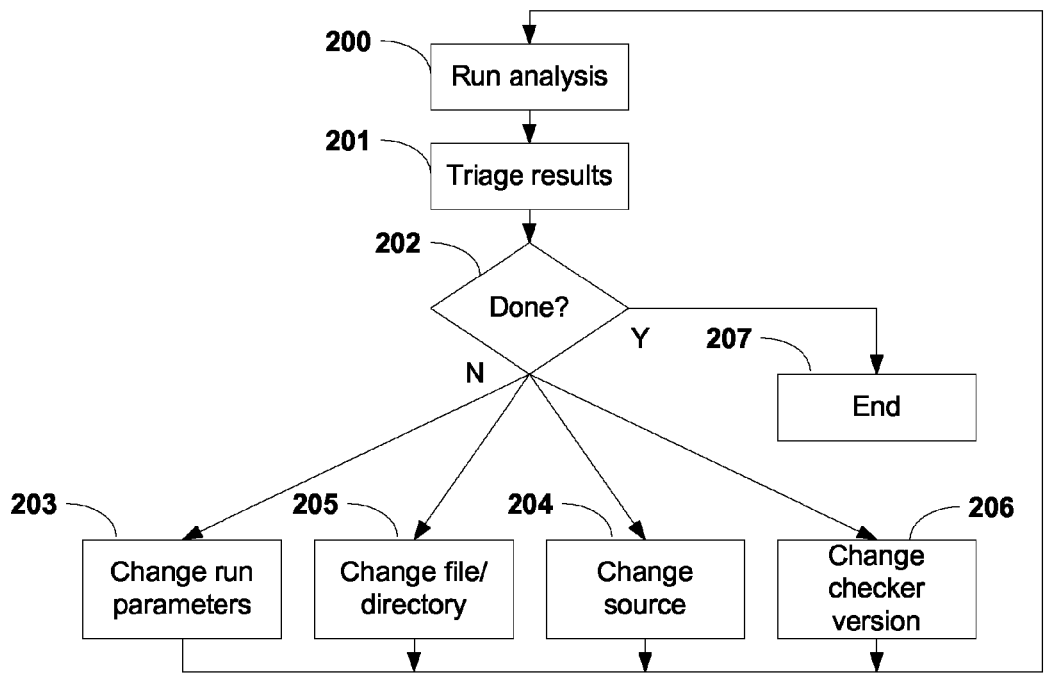
FIG. 2 illustrates an exemplary method of using analysis tools in the course of developing a program.

FIG. 2 illustrates an exemplary process for managing the use of analysis tools. An analysis run is performed (Block 200), after which the results are triaged (Block 201). If the project is not complete as of the triage (Decision 202), then one of a number of things may be done, including but not limited to changing the analysis parameters (Block 203), making file and directory changes (Block 204), making changes to the source code (Block 205) and/or applying an updated version of the checker (Block 206), after which the analysis is then run again and any new results triaged (Blocks 200 and 201). Once the project is complete (Decision 202), then the process ends (Block 207).

Figure 3:
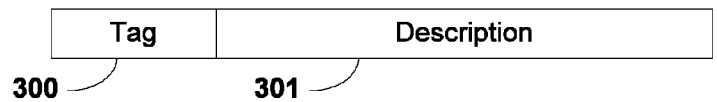
FIG. 3 illustrates one way of representing an event.

Individual patterns may be identified and recorded with an indication—typically an annotation or report element—that uses information about the pattern. Such information may be derived by identifying the portion of code within which the pattern was identified, and extracting information from it. Two such pieces of information may be the name of the checker and the function within which the pattern was identified. Further specificity may be useful if there are a variety of patterns that could coexist within a given function. One way of providing more clarity might be afforded by noting events within the code that are of note to the checker. Each checker may have different relevant events. As illustrated in FIG. 3, an event may be noted by a Tag 300 and a Description 301. This event will be associated with a line of code that instantiates the event.

Figure 4:
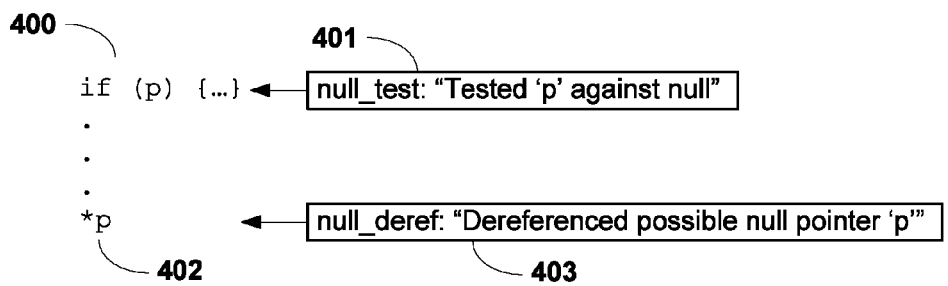
FIG. 4 illustrates the assigning of events to lines of code.

An example of events is provided in FIG. 4. The events described here may pertain to an exemplary checker whose purpose is to ensure that null pointers are not dereferenced. A pointer is a variable that contains the memory address of some entity; a null pointer is a pointer that points to nothing, null being a recognized way of representing "no address" (and being different from an uninitialized pointer). Null pointers may be useful, but may not be dereferenced. "Dereferencing" a pointer means accessing the entity to which the pointer points; if the pointer points to nothing, then dereferencing the pointer has no meaning, and will generate an error. A checker may then be useful in ensuring that null pointers are not unintentionally dereferenced.

In the example of FIG. 4, a pointer p is tested for a non-zero, or non-null, value (Code 400) in the C language; assuming the test passes, some instructions (unspecified in the example) are executed. The existence of this test may be a signal to the checker that the program writer considered that p may reasonably have a null value within the function, and an Event 401 is associated with this line of code.

Further on in the function, the pointer p is dereferenced (Code 402). This dereferencing is unconditional, and will occur whether or not p is null. Because there is reason to think that p may have a null value for some execution cases, this may be treated as a defect and be marked with Event 403. It may be appreciated that the text used for labeling events may vary widely according to the nature of the event and even the natural language in which the event is being presented. The exact manner of demarking the tag and remaining text may also vary; the colon and quotes used in FIG. 4 are an example, and are not intended to limit the invention.

Figure 4A:
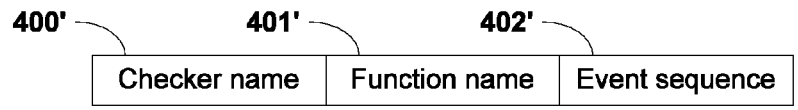
FIG. 4A illustrates a pattern annotation.

A pattern annotation may be further specified by reference to the sequence of events leading to the pattern. A pattern annotation may consist of three elements as illustrated in exemplary FIG. 4A. Here the three elements are shown as the name of the checker that identified the pattern (Item 400'), the name of the function within which the pattern was found (Item 401'), and the sequence of events (Item 402'). For example, if the defect illustrated in FIG. 4 were identified by checker "null_ref" in function "foo_test", then using the tags as proxies for the events, the following three data sets could comprise the pattern annotation: {"null_ref", "foo_test", ["null_test: Tested 'p' against null", "null_deref: Dereferenced possible null pointer 'p'"]}.

Pattern merging may then be accomplished by combining patterns that share the same checker name, function name, and sequence of events, that is, the same annotation. For example, if within the same function two null test/dereference sequences were found, those would be merged. This merging scheme is stable with respect to file/directory changes and source code changes, but has weakness with respect to analysis tool changes and over-merging.

Figure 5:
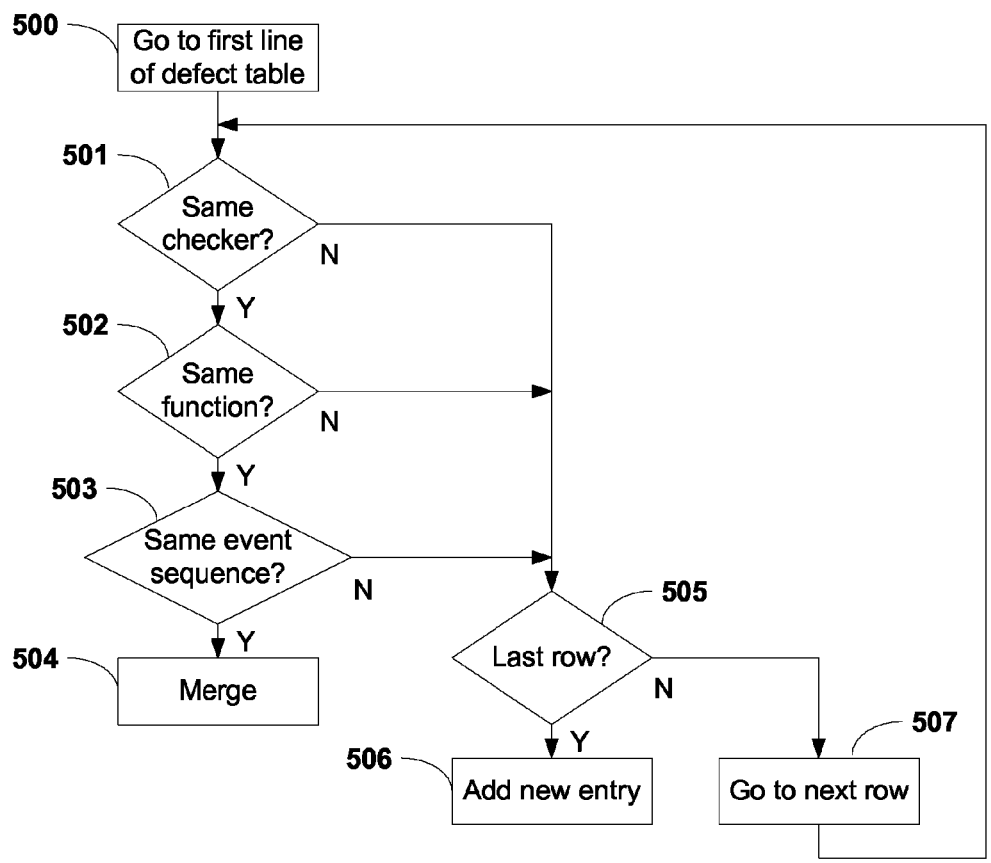
FIG. 5 shows an exemplary method for merging individual patterns.

One exemplary merging process is illustrated in FIG. 5. A new pattern is merged by starting at the top of the table of existing merged patterns (Block 500). The checker is tested to see if it's the same (Decision 501); if so, then the function is tested to see if it's the same (Decision 502); if so, then the event sequence is tested to see if it matches (Decision 503). If so, the pattern is merged into that line of the table (Block 504). If any of the tests in Decisions 501, 502, or 503 fails, then a check is made to see whether the end of the table has been reached (Decision 505); if not, then the next line is examined (Block 507) and the process repeats. If the last line has been reached, then the pattern is entered as a new pattern in the table (Block 506).

It may be appreciated that there may be many ways to structure a table such that identification of identical merged patterns may be simplified, through such means as alphabetizing or some other scheme. Such alternatives will be known to one of ordinary skill in the art, and corresponding methods that differ from the example shown in FIG. 5 appropriate to such a table may be readily devised in light of the description provided here, and without departing from the scope and spirit of the invention.

As an example of an analysis change, it could occur that some of the text in the event annotations contain misspellings. For example, Item 403 above might have text saying, "null_deref: "Dereferenced possible null pointer 'p'". After a release in which this error is corrected, a new run of the upgraded analysis tool will correctly merge multiple instances of this pattern within the same function, but will not merge it with the same pattern as identified in prior runs since the text associated with the event has changed. It will therefore be treated as a new merged pattern, while the older versions of this merged pattern will not be linked to it and will be isolated with no satisfactory disposition.

In addition, as noted, two separate instances of this individual pattern in the same function will be merged. This may lead to confusion, since one of the two instances may be corrected, leading the developer to think that the problem has been resolved, when in fact there remains a second less-visible pattern. This method of pattern merging therefore has the characteristic both of under-merging, in that a given pattern may not merge across runs, and over-merging, in that distinct patterns may be merged.

Different checkers may create different numbers of patterns within a single function. For some checkers, an annotation that simply identifies the function may suffice; this may simplify merging of patterns across runs. For other checkers, multiple patterns may be found within a function, so a further means of identifying them is required through the use of an additional discriminator within the annotation that is meaningful but resistant to over-merging and to change from version to version. A discriminator less specific than the full pattern event text but more specific than the tag associated with the event may provide better merging characteristics. Such a discriminator may provide greater utility by having the characteristics of being meaningful to a developer, being computable by any conceivable implementation, having a specific prescribed format or canonical form, and using the minimum required information to discriminate the pattern.

The characteristic of being meaningful to the developer may provide utility in that the developer may not only understand quickly the general nature of the pattern and likely causes, but may also be able to search for other patterns that may have similar discriminators. In addition, techniques for generating discriminators that are opaque to a developer may typically involve low-level implementation details that are more likely to change as a checker version is updated. Discriminators that are developer-comprehensible may therefore be more stable across multiple versions of a checker.

The characteristic of being computable by any conceivable implementation may promote consistency of discriminators regardless of the specific algorithms being used by the checker. This may also create greater stability across checker versions. In addition, consistency across analysis architectures may be provided, for example between a checker analyzing source code and a checker analyzing byte code for a language that may be compiled to byte code.

The characteristic of utilizing a canonical form ensures that a checker will use the content of the elements being used to generate the discriminator, and will not use the format of those elements, which may vary from instance to instance in the program being analyzed. For example, punctuation and whitespace may vary significantly across instances, and were those to be incorporated into the discriminator, then different discriminators would be created for instances where the elements were identical but punctuated differently. Similarly, different expressions involving the same elements would create different discriminators if the operators were taken into account. In addition, equivalent discriminators involving multiple elements might be considered different if the order in which the elements appeared were taken into account. Such examples of creating distinct discriminators for what should be equivalent discriminators may be avoided through the careful use of a canonical form as will be described below.

The characteristic of using the minimum necessary and sufficient information to discriminate the pattern contributes to increased merged pattern stability since all information is at some risk of change. The less information included in a discriminator, the lower the risk of version-related changes. For example, a pattern may be noted in conjunction with an instruction that includes a long string constant. The existence of the constant is likely to be stable across revisions and may provide discriminatory value against other similar patterns having no string constants or a different number of string constants, but the exact value of the constant may change across revisions or be more information than is necessary for discrimination in such cases. Acknowledging the existence of the string constant without including the constant outright may be accomplished by such means as replacing the actual string constant with a more general string constant such as the string constant "<string constant>".

Figure 5A:
FIG. 5A illustrates an improved pattern annotation.

Thus an improved pattern annotation may include up to three elements: the name of the checker that identified the pattern; the name of the function within which the pattern was found; and, optionally, a discriminator. Exemplary FIG. 5A illustrates this improved annotation, which is similar to the annotation of FIG. 4A, but where the event sequence (Item 402') is replaced by an optional discriminator (Item 500'). Each checker may have a unique set of discriminators, or no discriminators, according to the specific requirements of the checker. The discriminator may be derived from one or more lines of code representing the pattern, and may include such components as a variable name, a class name, a function name, and/or expressions combining such components. Format elements for the discriminator may include elimination of operators and sorting of variables for expressions, elimination of template arguments and parameter types in function names, and elimination of template arguments in class names.

Figure 6:
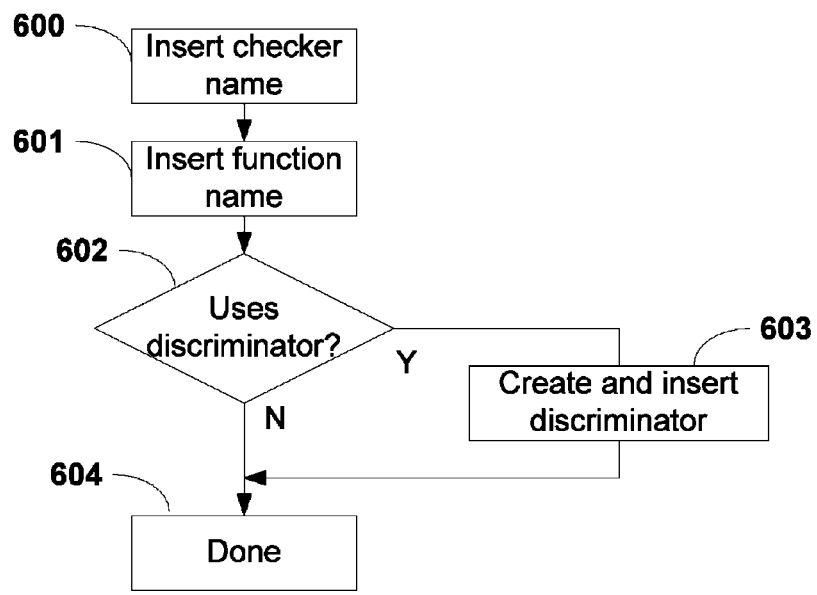
FIG. 6 shows an exemplary method for creating a unique identifier for a pattern.

FIG. 6 illustrates an exemplary process for creating an annotation for a specific individual pattern. First the checker name is inserted (Block 600), then the name of the function in which the pattern was located is inserted (Block 601). A check is then made to see whether the checker requires a discriminator (Decision 602); if so, then one is created and inserted (Block 603); otherwise the process completes (Block 604).

Figure 7:
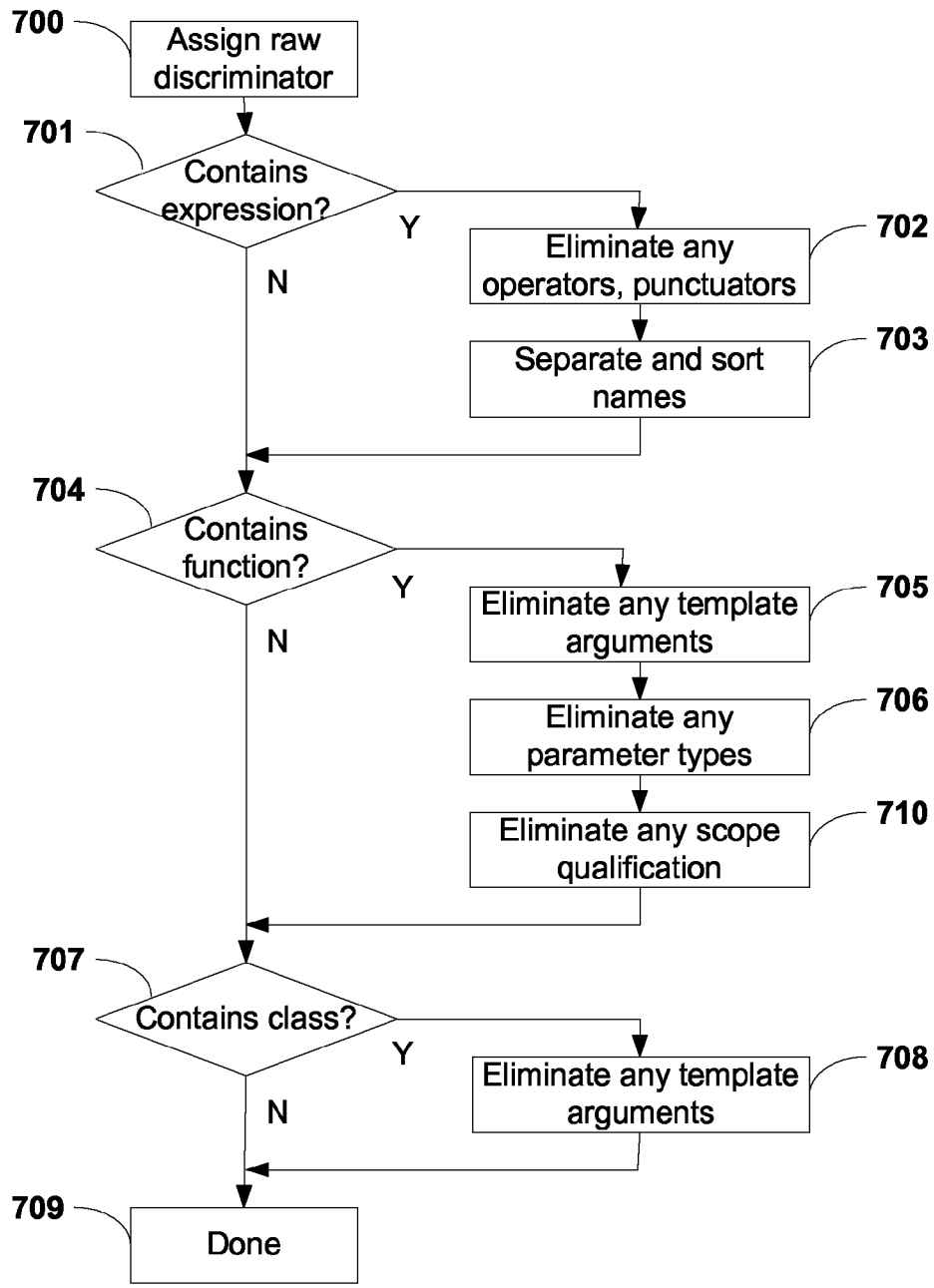
FIG. 7 shows an exemplary method of creating a suitable discriminator to be used as part of the identifier of a pattern.

One exemplary method for creating a discriminator in Block 603 is shown in FIG. 7, in which the names of relevant elements are identified and organized into a prescribed format. In this non-limiting process, a raw discriminator is first created in non-canonical form, and is then modified to put the discriminator into a canonical form. First a raw discriminator is created (Block 700) whose specific form will be determined by the specific checker creating it; it may contain expressions and/or other function names and/or class names. If the discriminator contains an expression (Decision 701), then any operators and punctuators are eliminated (Block 702) and the names are separated and sorted (Block 703). Operators and punctuators may include a wide range of symbols that will be known to one of ordinary skill in the art in light of the description provided herein, along with their surrounding whitespace; the effect of eliminating them should be to isolate only variable, class, and function names. Any suitable sort order of names may be used so long as it is used consistently from revision to revision. Separation of the names may be done by any suitable character, such as a comma. If the discriminator contains fully qualified function names (Decision 704), then any template arguments are eliminated (Block 705), any parameter types are eliminated (Block 706), and any scope qualification is eliminated (Block 710). If the discriminator contains class names (Decision 707), then any template arguments are eliminated (Block 708). At this point the process completes (Block 709), having transformed the raw discriminator into canonical form.

An example illustrating the exemplary methods of FIG. 6 and FIG. 7 may be given for a checker named "example_checker" examining a function "foo_1" within which a defect is found on a line containing the code "x=b+foo_2(a)". Assuming a discriminator is desired that includes the expression on the defective line, first a raw discriminator may be created simply by using the full expression "x=b+foo_2(a)". Since this raw discriminator contains an expression, first the operators and punctuators are eliminated and the elements are separated by commas, changing the expression to "x,b,foo_2,a". Then the variables and function names are sorted, in this exemplary case, in alphabetical order, yielding "a,b,foo_2,x". In this instance, the function reference involves no template parameters, scope qualification, or types, so there is no need to eliminate those. There is no class template, so no class template arguments need to be eliminated. Thus the resulting canonical discriminator is "a, b, foo_2, x". The annotation will then be ("example-checker", "foo_1", "a,b,foo_2,x").

Analysis by a checker may be performed on source code or some lower-level representation of the code used by tools including but not limited to compilers and linkers. Such lower-level representations may have versions of names and expressions that are not intended to be comprehended by the programmer, and may be in a format intended to be more efficient; the process of creating this format will be referred to hereinafter as mangling. The format of the code being analyzed and the specific method of mangling used may vary by elements including but not limited to checker, tool, and computing environment, and are not intended to limit the invention. In an example, a mangled function reference "_ZN9class_abc5foo_3Ei" is used to create a discriminator. This may be unmangled to yield "class_abc::foo_3(int)". Note that in this example, only the parameter type is indicated, not the parameter name. This aspect of the example is a product of the mangling method, and is not intended to limit the invention. First the raw discriminator is generated using the full function name as "class_abc::foo_3(int)". There is no expression, so no elimination of operators or sorting is required. There is a function name, but there are no template arguments to remove; parameter types are eliminated, yielding "class_abc::foo_3"; and finally the scope qualification is removed, yielding the final canonical discriminator "foo_3". The annotation for a pattern identified by a checker named "other_checker" within function "foo_4" would then be ("other_checker", "foo_4", "foo_3").

Note that this is an example process only, and the steps may be performed in a different order, without departing from the scope and spirit of the invention. While the illustrated process is particularly amenable to analysis of C or C++ programs, adapting the method for other languages will be straightforward for one of ordinary skill in the art in light of the description provided herein. The specific method used for isolating, sorting, and formatting specific variable names, function names, and class names is not intended to limit the invention.

Figure 8:
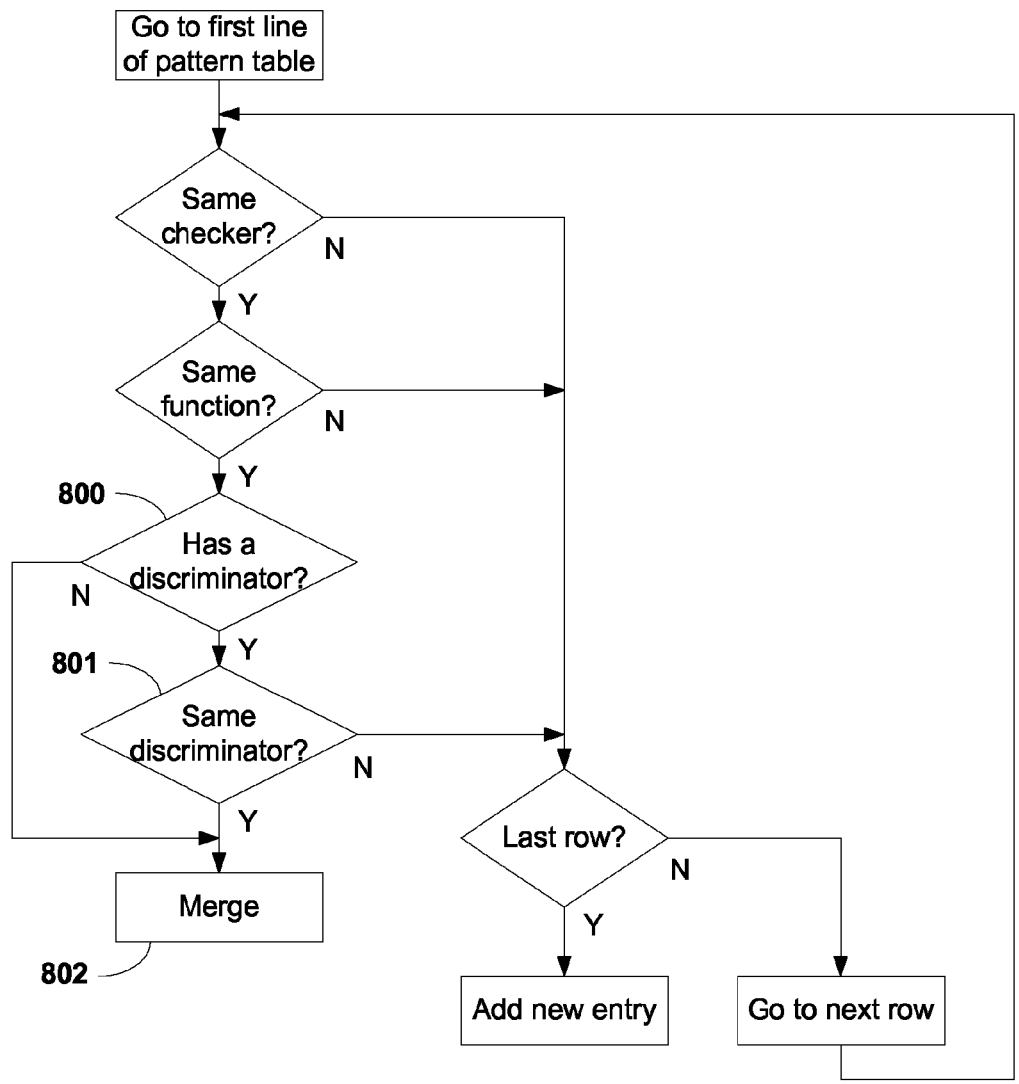
FIG. 8 illustrates an exemplary method for merging individual patterns using a discriminator.

Given this new means of generating a discriminator, the method of FIG. 5 for merging patterns may be modified as shown in FIG. 8. Here Decision 503, which involved an event sequence, is replaced with two steps. In Decision 800, the pattern is checked to see whether it has a discriminator, since some checkers may not generate discriminators. If there is no discriminator on either the pattern being merged or on the current merged pattern, then the pattern can be merged as is (Block 802). If there is a discriminator, then it is checked to see if it's the same as the discriminator on the merged pattern (Decision 801). If so, the patterns are merged (Block 802); otherwise the search for a match continues.

Figure 9:
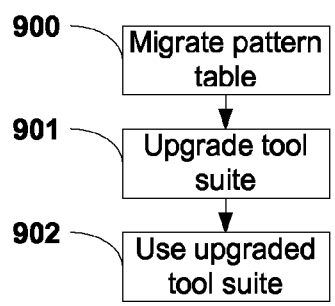
FIG. 9 illustrates a process for upgrading an analysis tool suite in the context of a change in pattern tables.

In another aspect of the invention, managing the upgrade of a table of patterns derived using an older technique to one that uses a new technique may be accomplished in a systematic way through a careful mapping of merged patterns in conjunction with the individual patterns that were merged. This upgrade process may be executed as part of an overall process of migrating from one version of an analysis tool or tool suite to a new version, as indicated by the exemplary process illustrated in FIG. 9. This process starts by first migrating the pattern table (or tables) from the structure associated with the older version of the analysis tools to the structure associated with the new version (Block 900), in a manner to be described below. Following table migration, the tool or tool suite can be upgraded (Block 901) and used (Block 902). Note that it may be possible to upgrade the tool before migrating the table, but usage of the new version of the tool may typically require migration of the table prior to usage.

A merged pattern may typically have an identifier associated with it whose form may vary, but which may typically be numeric. This identifier may become the means by which the pattern is communicated and ultimately resolved. It may be appreciated that an upgrade to the analysis system that results in the changing of the merged pattern identifiers may create significant problems by dissociating a pattern with all historical documents referring to an older identifier of that pattern. In addition, each merged pattern may have a series of pieces of associated information or attributes. Such attributes may include, but not be limited to, classification of the pattern, owner of the pattern and/or its resolution, action taken or required with respect to the pattern, and textual comments regarding the pattern. When the analysis system is upgraded, loss of these attributes or unanticipated changes to them may seriously impair productivity as the developer must manually resolve them. It may be appreciated that maintaining the integrity of existing attributes is an important characteristic of an upgrade strategy.

Figure 10:
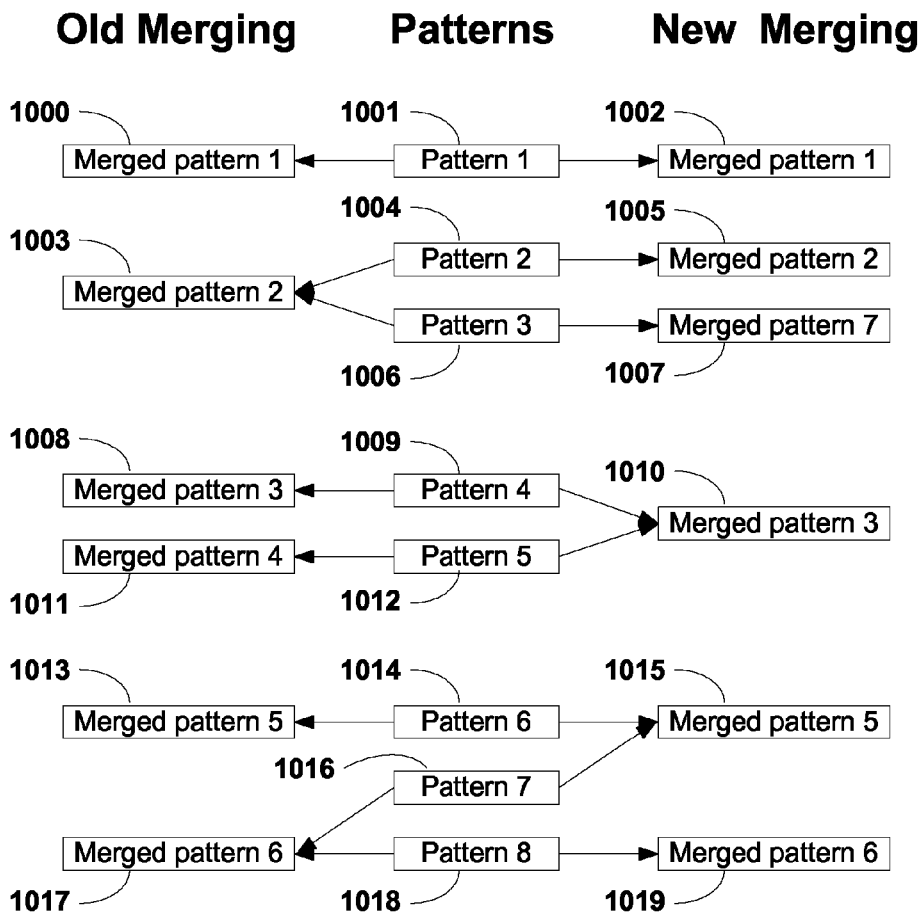
FIG. 10 illustrates examples of pattern merging changing from one version of a tool to the other.

FIG. 10 illustrates a variety of patterns as shown in the center, with their old merging on the left and new merging on the right. The differences in merging may, for the sake of this example, be due to changes in merging strategies between the two versions of the analysis tool. Pattern 1 (Item 1001) represents an individual pattern that was originally merged as merged pattern 1 (Item 1000), and the new merging maintains that merging such that no change is required and it remains merged pattern 1 (Item 1002). Any notes, comments, classifications, dispositions, or other attributes associated with Item 1000 are brought over and included in Item 1002. Note that in this particular example, Pattern 1 is actually not merged with any other individual pattern, and so this represents a degenerate case of merging. Nonetheless, because the individual pattern has passed through the merging process, even though it wasn't merged with any other individual pattern, the result is still referred to herein as a merged pattern.

Patterns 2 and 3 (Items 1004 and 1006) are individual patterns that are shown merged together under the old scheme as merged pattern 2 (Item 1003); the new scheme as shown now distinguishes those as two separate patterns, and no longer merges them together. One remains merged pattern 2 (Item 1005), but a new merged pattern is required for pattern 3, and in this example, merged pattern 7 is created (Item 1007). Any notes, comments, classifications, dispositions, or other attributes associated with Item 1003 are copied to Item 1005 and Item 1007; in addition, Item 1007 may be annotated with a comment explaining that it was a new merged pattern split off from what used to be merged pattern 2 (Item 1003).

Patterns 4 and 5 (Items 1009 and 1012) are shown as originally having separate merged pattern status (Items 1008 and 1011) in the old scheme, but being merged together in the new scheme (Item 1010). The new merged pattern 3 (Item 1010) may be annotated with a comment indicating that it is a result of the joining together of what were formerly separate merged patterns. Any notes, comments, classifications, dispositions, or other attributes associated with the former individual merged patterns must also be combined and rationalized, and any such rationalization may be noted.

An example of rationalizing attributes may be illustrated by an exemplary embodiment having a classification, severity, action, and owner attributes associated with each merged pattern. A conflict may be said to exist if the classifications are different, with neither classification being Uninspected; the severities are different, with neither severity being Unknown, the actions are different, with neither action being Undecided; or the owners being different, with neither owner being Unassigned. This means that the values of these attributes may be different, but if one of them has a "null" value (Uninspected classification, for example) then no conflict may be said to exist, with the non-null value being assigned to the joined merged pattern. Where there are conflicts, they may be resolved by changing classification to Pending; changing action or severity to the highest priority setting of the two old merged patterns being joined; and for owner, an arbitrary—but systematic—decision being made. The conflict resolution is then noted in the merged pattern so that a developer can see what happened.

Note that the above example uses specific fields and values associated with those fields; this is but one embodiment, and it may be appreciated that a similar resolution process may be applied to systems with different fields and/or allowed values for the fields without departing from the scope and spirit of the invention. Adaptation to embodiments having different fields and values will be straightforward for one of ordinary skill in the art in light of the description provided herein.

The examples of changes in merging illustrated above are specific instances of what can be a much broader set of changes, another example of which is shown towards the bottom of FIG. 10. Here pattern 7 (Item 1016) was formerly merged with pattern 8 (Item 1018) as merged pattern 6 (Item 1017), while it is now merged with pattern 6 (Item 1014) into merged pattern 5 (Item 1015). As before, attributes must be resolved for the case where attributes from merged pattern 5 and merged pattern 6 (Items 1013 and 1017) are joined into merged pattern 5 (Item 1015). The new merged pattern 6 (Item 1019) meanwhile gets a simple copy of the attributes from the old merged pattern 6 (Item 1017).

Figure 11:
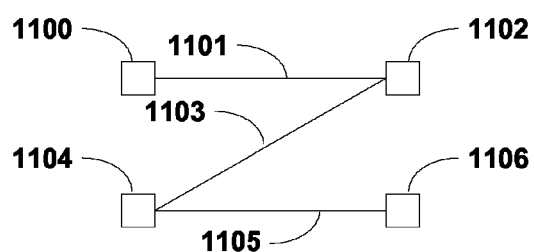
FIG. 11 illustrates a graph abstracted from one example of a changed pattern merging function.

Because the various ways in which old merged patterns can be resolved into new merged patterns, a generalized approach is required. One approach may treat the merged pattern mapping as a graph, as illustrated in FIG. 11. The mapping is modeled as a series of Nodes (Items 1100, 1102, 1104, and 1106) and Edges (Items 1101, 1103, and 1105). Each different mapping case may be modeled by a similar graph. A procedure is then used to assign a primary edge: a primary edge will be such that the merged pattern number of the old merged pattern on one end of the primary edge will be preserved on the new merged pattern at the other end of the primary edge. For example, if Edge 1103 is assigned as a primary edge, then Nodes 1104 and 1102 will have the same merged pattern number; the merged pattern number for Node 1100 may disappear, and a new number will be assigned to Node 1106.

The means for deciding which edges are to be considered primary may vary, but each node must be connected by at most one primary edge. For example, it may be determined that it is beneficial that assignment be made in such a way as to maximize the number of primary edges. In FIG. 11, either Edge 1103 may be a primary edge, or Edges 1101 and 1105 may be primary edges. If maximizing the number of primary edges is a goal, then the latter assignment would be selected. Another approach might be to assign primary edges to nodes representing old merged patterns having more comments. The specific criteria by which the assignment of primary edges is made is not intended to limit the invention. Given a criterion, the process of assigning the primary edges—whether algorithmically or by brute force, generating all possible combinations and picking from there—will be straightforward for one of ordinary skill in the art in light of the description provided here, and is not intended to limit the invention.

Figure 12:
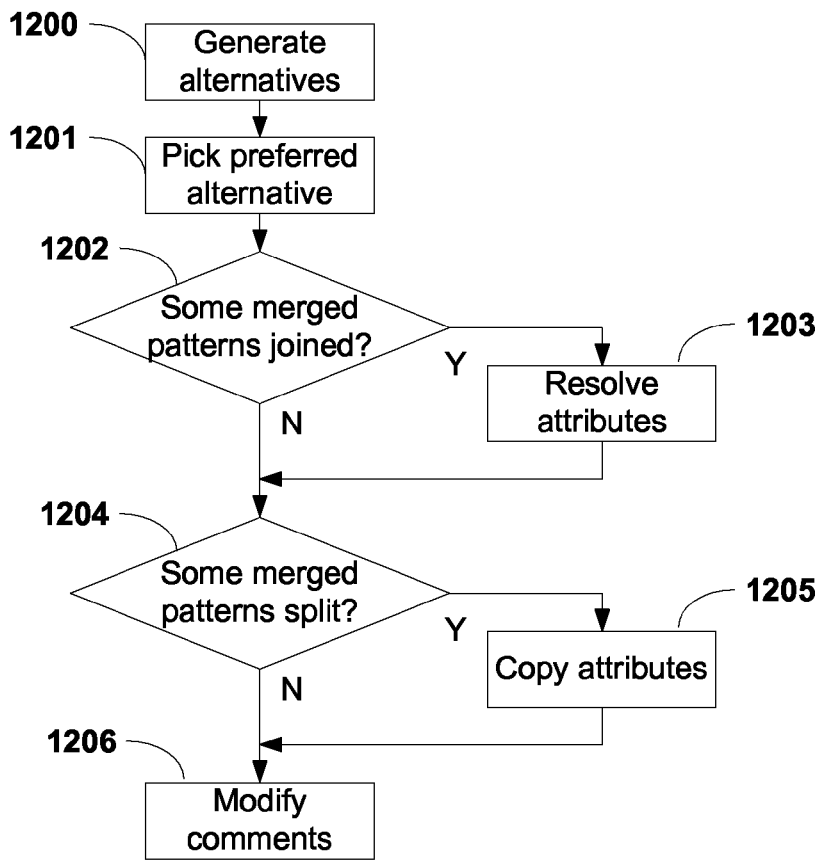
FIG. 12 illustrates an exemplary method of migrating merged patterns from one version of a tool to another.

It may be appreciated that a group of patterns and their associated merging as illustrated in FIG. 10 may be partitioned into groups of interconnected merged patterns. For example, old merged pattern 1 (Item 1000) (that is, the merged pattern 1 that was created under the old merging scheme), the individual pattern (Item 1001) that was merged into old merging pattern 1, and new merged pattern 1 (Item 1002) (that is, the merged pattern 1 that was created under the new merging scheme from individual pattern 1) are interconnected by virtue of the arrows shown, but old merged pattern 1 (Item 1000) and old merged pattern 2 (Item 1003) are not interconnected since there is no path of arrows leading from one to the other. FIG. 12 illustrates a general process for selecting a mapping for an interconnected group of merged patterns. First alternatives are generated, having different sets of primary edges (Block 1200). The means by which those alternatives are generated, and whether or not they constitute a full set or limited subset of the full possible number of alternatives, is not intended to limit the invention. A preferred alternative is then selected (Block 1201). The means by which an alternative is considered to be preferred may vary according to the design goals of the developer, and given a consistent set of criteria for picking the preferred alternative, the implementation of that alternative should be straightforward for one of ordinary skill in the art in light of the description provided here. If two formerly independent merged patterns are being joined (Decision 1202), then their attributes must be resolved (Block 1203). As illustrated above, there are different ways in which attributes may be resolved; all will be straightforward for one of ordinary skill in the art in light of the description provided here, and the choice of resolution is not intended to limit the invention. Alternatively, if one merged pattern is being split into two new independent merged patterns (Decision 1204), then the attributes are copied to the new merged pattern (Block 1205). Finally, comments are modified as necessary to annotate any resolutions or other decisions made in the mapping process (Block 1206).

Figure 13:
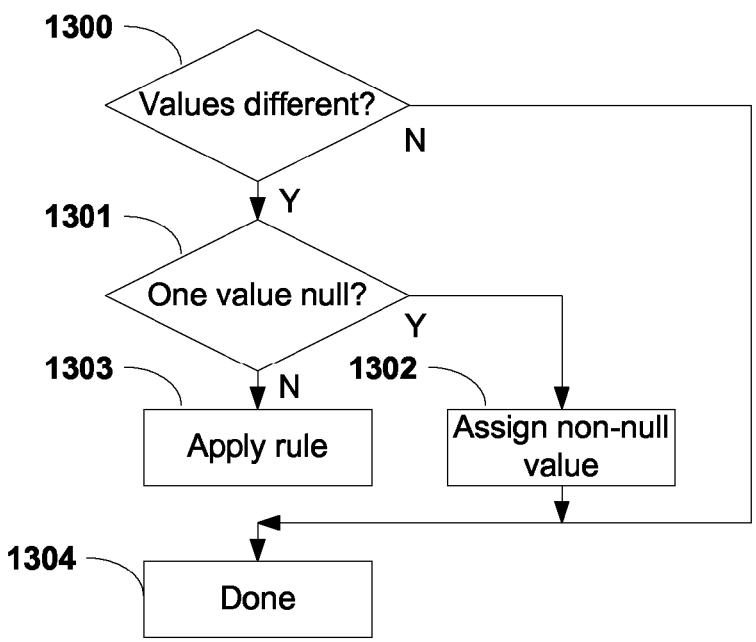
FIG. 13 illustrates an exemplary method for resolving attributes during the migration of merged patterns from one tool version to another.

One generalized exemplary method for resolving attributes is illustrated in FIG. 13. First the attribute values are examined to see if they are different (Decision 1300). If not, then no resolution is necessary and the process completes (Block 1304). If the values are different, then they are checked to see if one of the values has a null value (Decision 1301). The specific value considered null may vary by implementation. The significance of null in terms of the attribute may also vary according to the semantics of the attribute; for example, it may mean "undefined", "unassigned", or "empty", among other possible meanings. The representation and significance of null are not intended to limit the invention. If one of the values is null, then the resolved value is assigned to the non-null value (Block 1302). If neither value is null, then a rule appropriate to the attribute will be applied (Block 1303). The rule may specify any of a number of possible resolutions according to the design of the system; the specific rule used is not intended to limit the invention. Once either null or a rule has been assigned, the process completes (Block 1304).

A new version of an analysis tool or tool suite may have discriminators where an older version did not, or may have discriminators that are different from those of a prior version. The process of migrating pattern tables may require generating a new discriminator for the new tables. The migration process may rely on information in the older version of the pattern tables in order to build the desired discriminator. For example, known strings in the older table may be parsed to extract the desired information. If the older pattern tables do not have the desired information, then the choice of new discriminator may need to be chosen in a manner that is suboptimal as compared to the choice that might be made if no migration were required. For example, it could be that in a null pointer dereference check, only the pointer name is stored in the old defect table, created by a version 1 of the tool. If the new optimal discriminator generated by version 2 of the tool were desired to include the entire expression in which the null dereference occurred, not just the pointer name, that information would not be available in the old defect table. In this case, the new version of the tool or tool suite may work with the suboptimal discriminator, but include the desired information in the pattern tables such that with the next upgrade, the migration process will be able to access that information in the pattern tables and build an optimal discriminator. In the example given, the suboptimal discriminator generated by version 2 could not include the entire expression because the expression doesn't exist in the old defect table generated by version 1; it could only include the pointer name. However, when analysis is run using version 2 of the tool, the desired expression could be stored in a string within the defect table somewhere other than the discriminator. Version 3 of the tool could then be built with the knowledge of where that expression was stored by version 2, and could access that expression in its upgrade process, and use it to generate the desired optimal discriminator.

Figure 14:
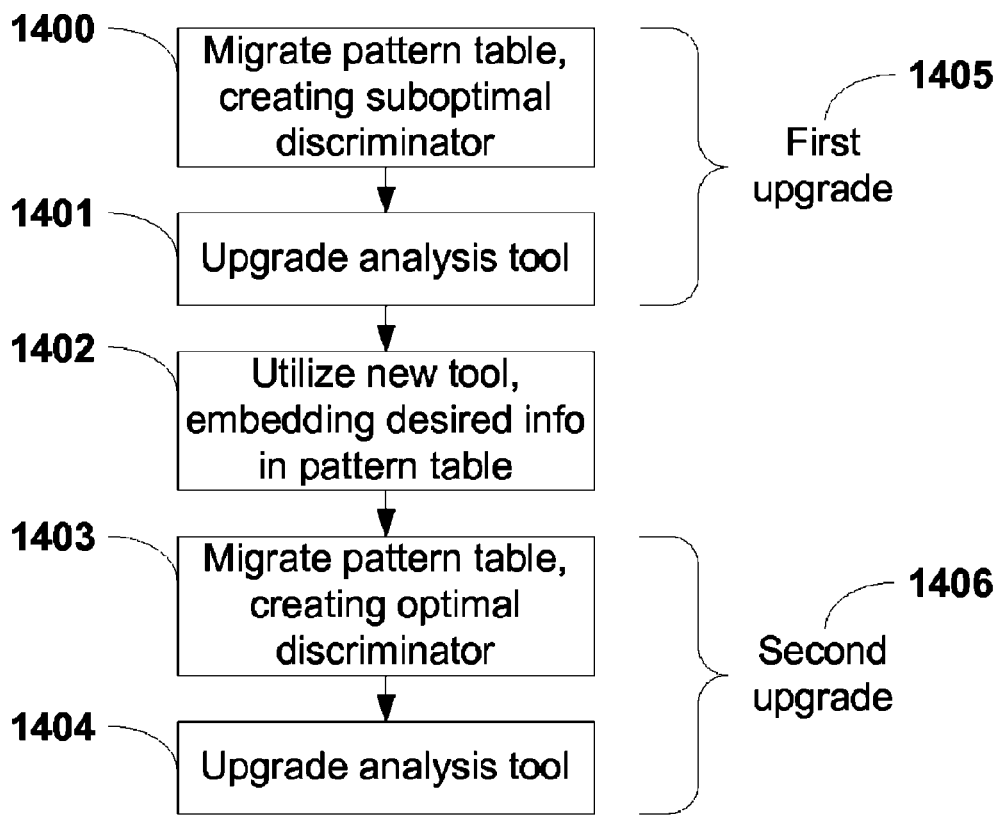
FIG. 14 illustrates an exemplary process for successively upgrading to improve the quality of a discriminator.

This successive process of upgrading to the desired discriminator is illustrated by the non-limiting exemplary process of FIG. 14. A first upgrade is performed (Block set 1405) by migrating the pattern tables in a manner that generates a suboptimal discriminator (Block 1400). Then the tool suite is upgraded (Block 1401) and used (Block 1402). During usage, the data desired in an optimal discriminator is stored in the pattern tables in comments, error messages, or some other format that is not intended to limit the invention, and that will be known to one of ordinary skill in the art in light of the description provided herein. Then, when a new version of the tool is available, a second upgrade is performed (Block set 1406), involving a pattern table migration that allows creation of the optimal discriminator (Block 1403), and the tool itself is upgraded (Block 1404).

The foregoing description has made reference to specific applications, implementations, and variations on those implementations. It may be appreciated that the benefits of the invention may be attained using implementations and variations other than those specifically shown, and in applications beyond those specifically mentioned, and that the use of the specific examples should not be interpreted to limit the application and scope of the invention.

The invention claimed is:

1. A method to categorize occurrences of a pattern in computer program code comprising:

using a checker program to identify a first individual pattern within a first function within the computer program code and to identify a portion of the program that is associated with the first such individual pattern;

wherein the checker program has a checker name;

wherein the first function is associated with a first function name;

defining a first discriminator associated with the identified first individual pattern of the computer program code;
  wherein defining a first discriminator includes identifying one or more first names from among names of one or more variables, classes and/or other functions that occur within the identified pattern;
  wherein defining the first discriminator further includes organizing the identified one or more first names in a prescribed format;

producing a first indication of the occurrence of the first instance of the pattern that includes the checker name, the first function name and the first discriminator; and associating the first indication with the identified portion of the computer program code;

using the checker program to identify a second individual pattern within the first function within the computer program code and to identify a portion of the computer program code that is associated with the second individual pattern;

defining a second discriminator associated with the identified pattern of the computer program code;
  wherein defining a second discriminator includes identifying one or more second names from among names of one or more variables, classes and/or other functions that occur within the identified pattern;
  wherein defining a second discriminator further includes organizing the identified one or more second names in the prescribed format; and producing a second indication of the occurrence of the second individual pattern that includes the checker program name, the first function name and the second discriminator;

determining whether the first and second indications of occurrences match; and storing the first and second indications of occurrences in a database;

wherein said act of storing includes merging the first and second indications of occurrence in response to a determination that they match.

2. The method of claim 1,
wherein identifying includes eliminating operators from the identified pattern.

3. The method of claim 1,
wherein identifying includes eliminating punctuators from the identified pattern.

4. The method of claim 1,
wherein identifying includes eliminating template arguments from the identified pattern.

5. The method of claim 1,
wherein identifying includes eliminating parameter types from the identified pattern.

6. The method of claim 1,
wherein identifying includes eliminating a scope qualification from the identified pattern.

7. The method of claim 1,
wherein organizing in a prescribed format includes sorting the identified names.

8. The method of claim 1,
wherein organizing in a prescribed format includes providing separators between identified names.

9. The method of claim 1,
wherein the at least one variable includes a reference to a variable.

10. The method of claim 1,
wherein the at least one class includes a reference to a class.

11. The method of claim 1,
wherein the at least one other function includes a reference to a function.

12. The method of claim 1 further including:
storing the first indication in a database.

13. The method of claim 1,
wherein said act of storing includes not merging the first and second indications of occurrence in the absence of a determination that they match.

14. The method of claim 1,
wherein determining whether respective indications of occurrences match includes determining whether the first and second discriminators match.

15. The method of claim 1,
wherein using the checker program to identify the first individual pattern involves using the checker program during a run of the checker to analyze the computer program code; and wherein using the checker program to identify the second individual pattern involves using the checker program during another run of the checker program to analyze the computer program code.

16. The method of claim 1,
wherein the first individual pattern represents a potential defect.

17. A method to categorize occurrences of patterns in computer program code comprising:
using respective checker programs to identify respective individual patterns within respective first set of functions within the computer program code and to identify respective portions of the computer program code associated with such respective identified individual patterns;

wherein respective checker programs have respective checker names;

wherein each function in the first set of functions are associated with respective first function names;

defining respective discriminators;
  wherein defining respective discriminators includes respectively identifying one or more names from among names of one or more variables, classes and/or other functions that occur within respective identified patterns;
  wherein defining respective discriminators further includes respectively organizing the identified one or more names that occur within respective identified patterns in respective prescribed formats; and producing respective indications of occurrences of respective patterns that include corresponding respective checker program names, respective function names from the first set of functions and respective discriminators;

determining whether respective indications of occurrences of respective patterns match; and storing respective indications of occurrences of respective patterns in a database;

wherein said act of storing includes merging respective indications of occurrence of respective patterns that are determined to match.

18. The method of claim 17,
wherein said act of storing includes not merging respective indications of occurrence in the absence of a determination that they match.

19. The method of claim 17,
wherein a determination that respective set of indications of occurrences match requires,
determining that their respective checker names match of the set match,
determining that their respective first function names of the set match, and
determining that their respective discriminators of the set match.

20. The method of claim 17,
wherein using respective checker programs to identify the respective individual patterns involves using at least one of the respective checker programs during multiple runs of that at least one checker program to analyze the computer program code.

21. The method of claim 17,
wherein the individual respective patterns represents a potential defects.

* * * * *